United States Patent

Nakamura et al.

[11] Patent Number: 6,050,146
[45] Date of Patent: Apr. 18, 2000

[54] PRESSURE DETECTION APPARATUS

[75] Inventors: Hiroshi Nakamura; Seiki Kodama; Toru Araki, all of Tokyo; Susumu Nagano, Hyogo, all of Japan

[73] Assignee: Mitsubishi Denki Kabushiki Kaisha, Tokyo, Japan

[21] Appl. No.: 08/876,518

[22] Filed: Jun. 16, 1997

[30] Foreign Application Priority Data

Nov. 19, 1996 [JP] Japan .................................... 8-308204

[51] Int. Cl.⁷ ........................................................ G01L 9/02
[52] U.S. Cl. ............................................................. 73/725
[58] Field of Search ...................................... 73/719, 725

[56] References Cited

FOREIGN PATENT DOCUMENTS

| 1-150830 | 6/1989 | Japan . |
| 1-150831 | 6/1989 | Japan . |
| 1-150832 | 6/1989 | Japan . |
| 6265426 | 3/1993 | Japan . |

*Primary Examiner*—William Oen
*Attorney, Agent, or Firm*—Sughrue, Mion, Zinn, Macpeak & Seas, PLLC

[57] ABSTRACT

To obtain a pressure detection apparatus capable of changing output characteristics in a large area and changing a received pressure range without largely changing the apparatus in design. The apparatus comprises a pressure sensor including a pressure detection element having a bridge circuit to which a gauge resistor formed around a diaphragm portion formed by decreasing a part of the element in thickness is connected and an amplification circuit body serving as an amplification circuit except for an adjustment resistor, the pressure sensor being airtightly accommodated in a package having a pressure supply portion for supplying a pressure to be measured to the diaphragm portion, and a lead portion being disposed in the pressure sensor; an adjustment resistor part constituting the amplification circuit of the bridge circuit together with the amplification circuit body; a circuit substrate which is mounted by soldering to expose the pressure sensor and the adjustment resistor part and has a terminal portion for leading out an output from the amplification circuit; and a sensor accommodation vessel for accommodating an assembly constituted by the pressure sensor, the adjustment resistor part, and the circuit substrate therein.

4 Claims, 4 Drawing Sheets

PRESSURE DETECTION APPARATUS

BACKGROUND OF THE INVENTION

1. Field of the Invention

The present invention relates to a pressure detection apparatus comprising a pressure sensor including a pressure detection element having a bridge circuit constituted by a pressure sensitive resistance to measure a pressure of gas or fluid.

2. Description of the Related Art

FIG. 7 is a sectional view showing a pressure detection apparatus generally used as, e.g. . . . , an automobile intake pressure apparatus. Referring to FIG. 7, a pressure sensor 31 (to be described later) is mounted on a circuit substrate 30. The pressure sensor 31 is mounted such that a lead 31a projecting from one side of the pressure sensor 31 is soldered on the circuit substrate 30. A ceramic circuit substrate 32 having a U-shaped section is arranged on the circuit substrate 30 to cover the pressure sensor 31. An amplification circuit body 33 for amplifying an output signal from the pressure sensor 31 is disposed inside the ceramic circuit substrate 32. An adjustment resistor (not shown) constituting an amplfilcation circuit together with the amplification circuit body 33 is formed outside the ceramic circuit substrate 32. The adjustment resistor is printed on the outer surface of the ceramic circuit substrate 32. The pressure sensor 31, the amplification circuit body 33, and the adjustment resistor are electrically connected to each other with a wire 32a disposed on the ceramic circuit substrate 32 and a printed wire (not shown) disposed on the circuit substrate 30.

The pressure sensor 31 has a cylindrical nipple 31b for supplying a pressure of an object to be measured such as air. The pressure sensor 31 is mounted such that the cylindrical nipple 31b passes through a through hole (not shown) formed in the circuit substrate 30. Further, on the circuit substrate 30, a terminal 34 for leading out an signal output from the pressure sensor 31 and amplified by the above amplification circuit is disposed. An assembly constituted by the circuit substrate 30, the pressure sensor 31, and the ceramic circuit substrate 32 is fixed on a sensor accommodation vessel 35 such that the peripheral portion of the circuit substrate 30 is supported by the sensor accommodation vessel 35. The assembly is covered with a sensor accommodation vessel 36 to be accommodated in two sensor accommodation vessels 35 and 36. The pressure sensor 31 and the ceramic circuit substrate 32 are accommodated in the space formed inside the sensor accommodation vessels 35 and 36 not to be in contact with the vessels. A connector portion 36a to which an external connector (not shown) is connected is formed in the sensor accommodation vessel 36. The terminal 34 is supported at the center of the connector portion 36a to be buried therein. In the sensor accommodation vessel 35, a pressure supply tube 35a communicating with a cylindrical nipple 31b is formed.

FIG. 8 is a sectional view showing the internal structure of the pressure sensor 31. Referring FIG. 8, a pressure detection element 40 having a bridge circuit (to be described later) formed therein is airtightly disposed in the pressure sensor 31 to seal one end of the cylindrical nipple 31b. The pressure sensor 31 is accommodated in a can package 41 which is airtightly sealed. The pressure sensor 31 is electrically connected to the lead 31a with a bonding wire 42.

FIG. 9 is an upper view showing the pressure detection element 40. Referring to FIG. 9, the pressure detection element 40 consists of, e.g. . . . , silicon single-crystal. The central portion of the element 40 is partially formed to have a small thickness, and a diaphragm portion 43 deflected by a pressure is formed in the pressure detection element 40. A plurality of gauge resistor are formed at the peripheral portion of the diaphragm portion 43, and these gauge resistors are connected to each other to constitute a bridge circuit 44. The bridge circuit 44 converts deflection of the diaphragm portion 43 into an electrical change.

The operation of the apparatus will be described below. An object to be measured is guided through the pressure supply tube 35a disposed in the sensor accommodation vessel 35 and passes through the cylindrical nipple 31b to reach the pressure detection element 40. In accordance with this, the bridge circuit 44 disposed around the diaphragm portion 43 converts the deflection into an electrical change. An output from the pressure detection element 40 reaches the amplification circuit body 33 through the bonding wire 42, the lead 31a, and the circuit substrate 30 to be amplified by the amplification circuit body 33. The amplified output passes through the circuit substrate 30, and is output outside the sensor accommodation vessels 35 and 36 through the terminal 34.

In the pressure detection apparatus with such an arrangement, the output characteristics of the pressure detection apparatus are changed by function trimming performed such that the adjustment resistor formed outside the ceramic circuit substrate 32 is trimmed by a laser beam. More specifically, the adjustment resistor formed outside the ceramic circuit substrate 32 is partially trimmed by a laser beam to change a resistance value, thereby changing the output characteristics.

The range of a pressure which is received by the pressure detection apparatus is changed by the following manner. That is, the diaphragm portion 43 in the same pressure detection element 40 is changed in thickness, and the resistance value is changed accordingly.

In the conventional pressure detection apparatus described above, the adjustment resistor for changing characteristics is formed on the ceramic circuit substrate 32 by printing. The adjustment resistor is flatly formed by using one material or few types of materials, and different types of resistors are manufactured by making the areas of the resistors different. For this reason, the ceramic circuit substrate 32 requires a large area to form different types of resistors. Since the area of the ceramic circuit substrate 32 is limited to a specific area, the range of adjustable resistance value is limited to a specific range. For this reason, in order to considerably change characteristics, the ceramic circuit substrate 32 must be changed in design to be remade.

Furthermore, even if the resistance value is within the adjustment allowance range of the adjustment resistor, when an amount of trimming for adjustment is large, the trimming requires a long time. As a result, a time for changing the output characteristics is prolonged disadvantageously.

When the range of pressure which is received by the pressure detection apparatus is changed, the resistance value must be largely changed. For this reason, the ceramic circuit substrate 32 must be changed in design to be remade.

SUMMARY OF THE INVENTION

The present invention has been made to solve the above problem, and has as its object to provide a pressure detection apparatus in which output characteristics can be changed within a wide range without increasing the apparatus in size and largely changing the apparatus in design and in which the range of pressure received by the apparatus can be changed without largely changing the apparatus in design, and to provide an inexpensive pressure detection apparatus in which parts are decreased in number to improve assembling properties.

According to the first aspect of the present invention, a pressure detection apparatus comprises a pressure sensor including a pressure detection element having a bridge circuit which is made by connecting gauge resistors formed around a diaphragm portion formed by decreasing a part of the element in thickness and an amplification circuit body serving as an amplification circuit of the bridge circuit except for an adjustment resistor, a package which airtightly accommodates the pressure sensor and has a pressure supply portion for supplying a pressure to be measured to the diaphragm portion, and a lead portion which electrically connects the pressure detection element to an external portion and is led from the package; an adjustment resistor part constituting the amplification circuit of the bridge circuit together with the amplification circuit body; a circuit substrate which mounts the pressure sensor and the adjustment resistor part by soldering so that the pressure sensor and the adjustment resistor part are exposed and which has a terminal portion for leading out an output from the amplification circuit; and a sensor accommodation vessel which accommodates an assembly constituted by the pressure sensor, the adjustment resistor part, and the circuit substrate.

In a pressure detection apparatus according to the second aspect of the present invention, the adjustment resistor part is mounted on a surface of the circuit substrate opposing the pressure sensor.

In a pressure detection apparatus according to the third aspect of the present invention, the circuit substrate is integrated with the sensor accommodation vessel.

In a pressure detection apparatus according to the fourth aspect of the present invention, the adjustment resistor part is a chip resistor part.

DESCRIPTION OF THE PREFERRED EMBODIMENTS

Embodiment 1

Figure 1:
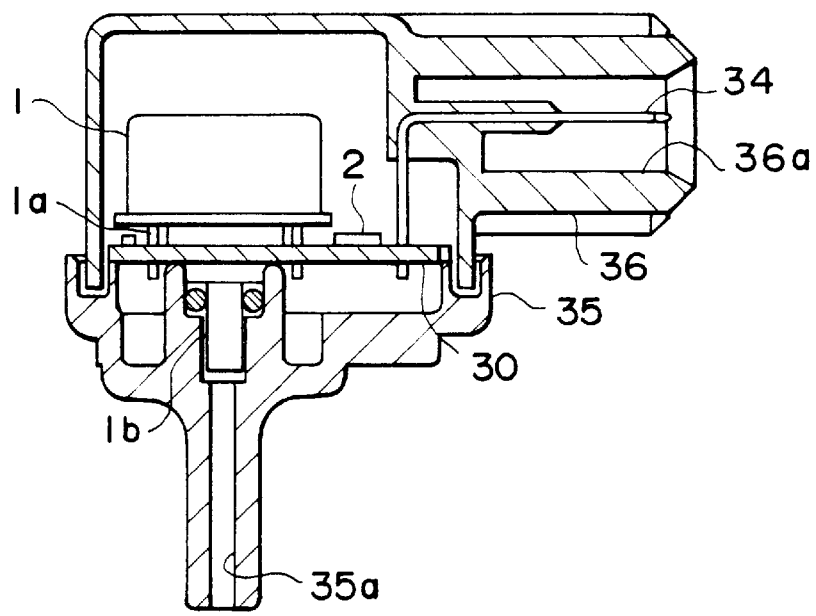
FIG. 1 is a sectional view showing a pressure detection apparatus according to the present invention.

FIG. 1 is a sectional view showing a pressure detection apparatus according to the present invention. Referring to FIG. 1, a pressure sensor 1 is mounted on a circuit substrate 30. The pressure sensor 1, as in the related art described above, is mounted such that a lead 1a extending from one side of the pressure sensor 1 is soldered on the circuit substrate 30. As in the related art, the pressure sensor 1 has a cylindrical nipple 1b serving as a pressure supply portion for supplying a pressure to be measured, and is mounted such that the cylindrical nipple 1b is caused to pass through a through hole (not shown) formed in the circuit substrate 30.

A adjustment resistor chip part 2 serving as an adjustment resistor part required for adjustment of a gain, an offset, or temperature characteristics is mounted on the circuit substrate 30 by soldering. The adjustment resistor chip part 2 partially constitutes an amplification circuit (to be described later). The adjustment resistor chip part 2 is a commercial part constituted by a resistor consisting of various materials and formed on a ceramic substrate. The adjustment resistor chip part 2 is formed such that the resistor is partially exposed to perform function trimming to the surface of the adjustment resistor chip part 2.

Figure 2:
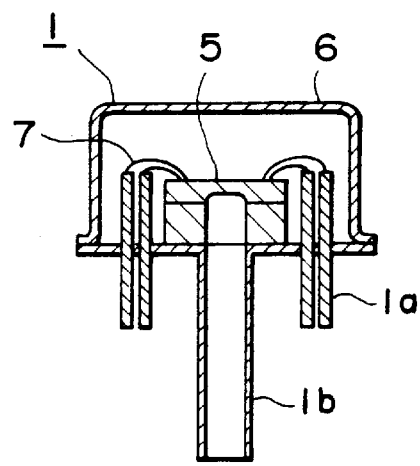
FIG. 2 is a sectional view showing the internal structure of a pressure sensor.

A terminal 34 serving as a terminal portion for guiding out an output signal from the pressure sensor I as in the related art is disposed on the circuit substrate 30. The assembly of the circuit substrate 30 and the pressure sensor 1 is accommodated in two resin sensor accommodation vessels 35 and 36 such that the peripheral portion of the circuit substrate 30 is supported as in the related art FIG. 2 is a sectional view showing the internal structure of the pressure sensor 1. Referring to FIG. 2, a pressure detection element 5 having a bridge circuit formed therein is disposed in the pressure sensor 1 such that one end of the cylindrical nipple 1b is airtightly sealed. The pressure detection element 5 is accommodated in a can package 6 serving as a package having an airtightly sealed interior. The pressure detection element 5 and the lead 1a are electrically connected to each other with a bonding wire 7. The lead 1a is led out of the can package 6. The lead 1a and the bonding wire 7 constitute a lead portion for guiding an output from the pressure detection element 5 out of the can package 6.

Figure 3:
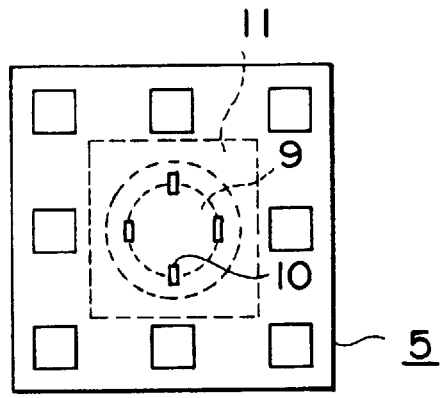
FIG. 3 is an upper view showing a pressure detection element.

FIG. 3 is an upper View showing the pressure detection element 5. Referring to FIG. 3, the pressure detection element 5 consists of, e.g. . . , silicon single-crystal or the like as in the related art The central portion of the element is formed to partially have a small thickness, thereby forming a diaphragm portion 9 which is deflected by receiving a pressure. A plurality of gauge resistors are formed on the periphery of the diaphragm portion 9, and these gauge resistors are connected to each other to constitute a bridge circuit 10. The bridge circuit 10 converts deflection of the diaphragm portion 9 into an electrical change. In the pressure detection element 5, an amplification circuit for amplifying an output from the bridge circuit 10 except for an adjustment resistor constituted by the adjustment resistor chip part 2 described above, i.e., an amplification circuit body 11 is formed. The amplification circuit body 11 constitutes an amplification circuit for amplifying an output from the bridge circuit 10 together with the adjustment resistor chip part 2.

The pressure detection apparatus is changed in characteristic in the following manner. That is, in a state wherein the sensor accommodation vessel 35 is not assembled, an external terminal (not shown) formed on the ceramic circuit substrate 32 is connected to an inspection device, and the adjustment resistor chip part 2 is subjected to function trimming while an output from the pressure detection apparatus is checked by the inspection device. If an amount of adjustment is large, another chip resistor part is selected and mounted on the pressure detection apparatus to change characteristics thereof. In addition, if the range of pressure received by the pressure detection apparatus is changed, the diaphragm portion 9 of the pressure detection element 5 is changed in thickness, and the adjustment resistor chip part 2 according to the thickness is selected and mounted on the pressure detection apparatus.

In the pressure detection apparatus disposed as described above, first, the part other than the adjustment resistor of the amplification circuit is built in the pressure detection element 5, and the adjustment resistor chip part 2 on which a large number of resistors can be mounted in a small area is used. For this reason, a compact apparatus can be obtained. Second, although output characteristics are changed by performing function trimming to the resistors formed on the surface of the adjustment resistor chip part 2, if an amount of adjustment is large, another adjustment resistor chip part 2 is selected and mounted. For this reason, the output characteristics can be changed in a large range without largely changing the apparatus in design.

Third, when the range of a pressure received by the pressure detection apparatus is to be changed, the diaphragm portion 9 of the pressure detection element 5 is changed in thickness, and the adjustment resistor chip part 2 according to the thickness is selected and mounted. For this reason, the pressure range can be easily changed without largely changing the apparatus in design. Therefore, pressure sensors having various types of pressure ranges can be supplied at low cost.

Embodiment 2

Figure 4:
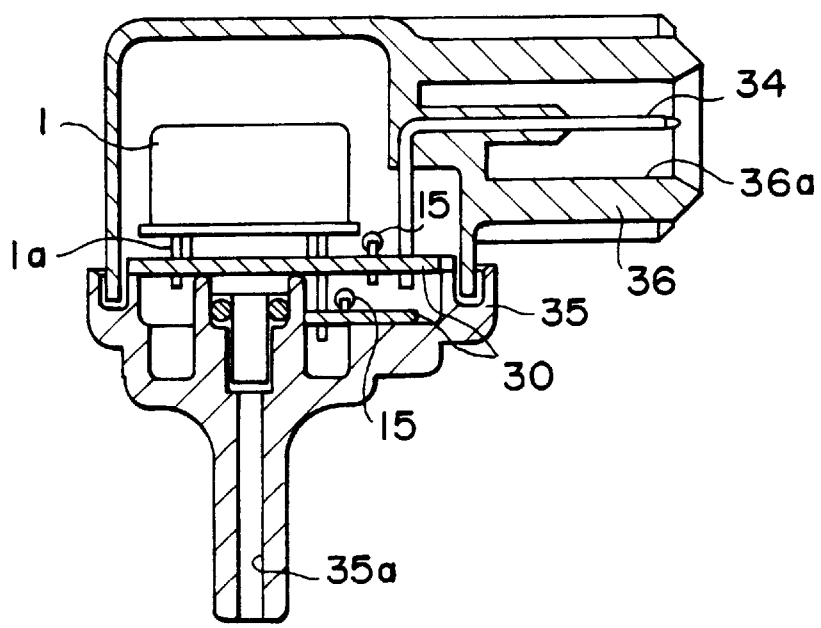
FIG. 4 is a sectional view showing a pressure detection apparatus according to another embodiment of the present invention.

FIG. 4 is a sectional view showing a pressure detection apparatus according to another embodiment of the present invention. Referring to FIG. 4, a circuit substrate 30 is divided into two parts which are respectively fixed on a sensor accommodation vessel 35. The pressure sensor 1 as in Embodiment 1 is mounted on one circuit substrate 30. A plurality of resistors 15 serving as adjustment resistor parts are mounted on the two divided circuit substrates 30 by soldering as needed. The resistors 15 are commercial parts such as carbon-coated resistors. The plurality of resistors 15 and an amplification circuit body 11 formed on a pressure detection element 5 disposed inside a pressure sensor 1 constitute an amplification circuit for amplifying an output from a bridge circuit 10. The remaining arrangement of Embodiment 2 is the same as that of Embodiment 1. The resistors 15 can exhibit the same function as that of resistors formed by printing with an area smaller than the area occupied by resistors formed by printing.

The pressure detection apparatus disposed as described above can be reduced in size because the resistors 15 are mounted on the circuit substrate 30. In addition, when output characteristics are to be change, this change can be made by selecting corresponding resistors from various types of resistors 15 and then packaging the selected resistors. The output characteristics can be changed in a large range.

Embodiment 3

Figure 5:
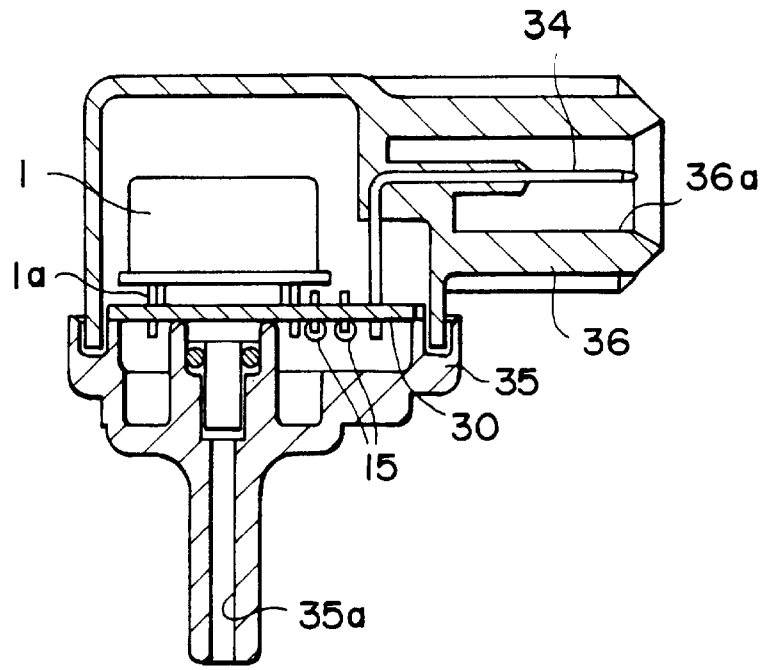
FIG. 5 is a sectional view showing a pressure detection apparatus according to still another embodiment of the present invention.

FIG. 5 is a sectional view showing a pressure detection apparatus according to still another embodiment of the present invention. Referring to FIG. 5, the same resistors 15 as in Embodiment 2 are mounted on a surface of a circuit substrate 30 opposing the surface on which a pressure sensor 1 is mounted. For this reason, since the parts are mounted on both the surfaces of one circuit substrate 30, packaging efficiency in a unit area increases. The circuit substrate 30 is single. The remaining arrangement of Embodiment 3 is the same as that of Embodiment 2.

The pressure detection apparatus disposed as described above can be more reduced in size because the resistors 15 are mounted on the surface of the circuit substrate 30 opposing the surface on which the pressure sensor 1 is mounted. Since the number of circuit substrates 30 can be reduced, parts decrease in number, and costs can be reduced.

Embodiment 4

Figure 6:
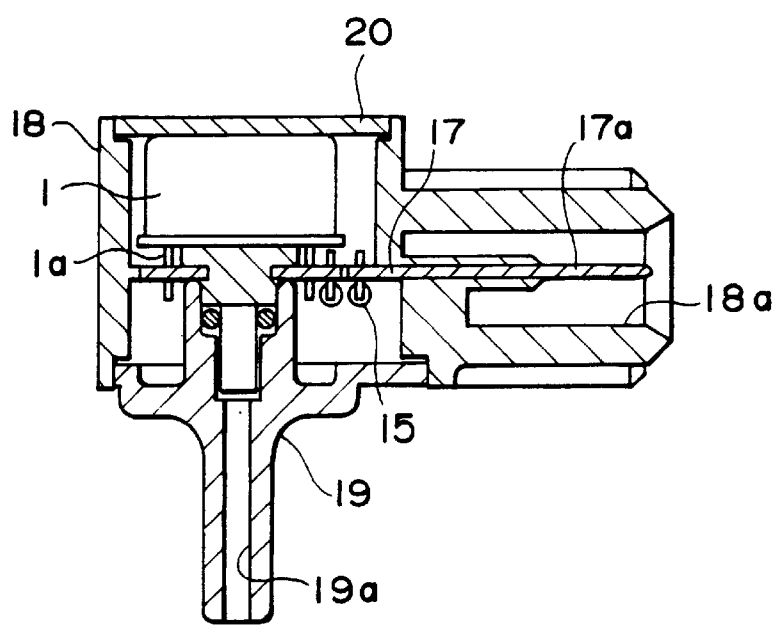
FIG. 6 is a sectional view showing a pressure detection apparatus according to still another embodiment of the present invention.
Figure 7:
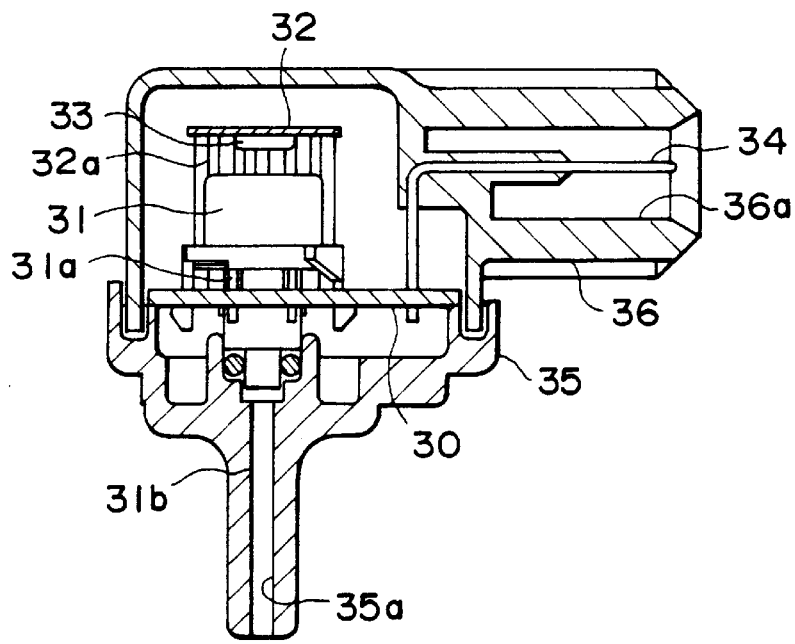
FIG. 7 is a sectional view showing a conventional pressure detection apparatus.
Figure 8:
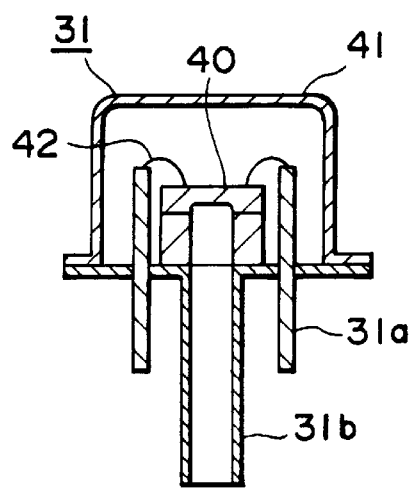
FIG. 8 is a sectional view showing the internal structure of a conventional pressure sensor.
Figure 9:
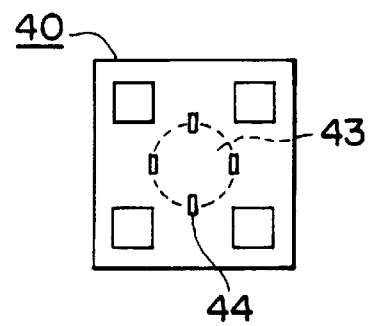
FIG. 9 is an upper view showing a conventional pressure detection element.

FIG. 6 is a sectional view showing a pressure detection apparatus according to still another embodiment of the present invention. Referring to FIG. 6, an intermediate portion of a sensor accommodation vessel 18 on the inner side is overhung from the periphery of the sensor accommodation vessel 18 to have a plate-like shape. A circuit pattern 17 for connecting a pressure sensor 1, resistors 15, and the like to each other is formed to be buried in the plate-like overhung portion. More specifically, a circuit substrate is integrated with the sensor accommodation vessel 18. The circuit pattern 17 is partially extended from a connector portion and projects as a terminal portion. The sensor accommodation vessel 18 is manufactured in the following manner. That is, a copper plate or the like is punched out by a press in advance to form the circuit pattern 17, the circuit pattern 17 is inserted in the sensor accommodation vessel 18 when the sensor accommodation vessel 18 is molded, and, as needed, an unnecessary portion is cut off by the press. The upper and lower openings of the sensor accommodation vessel 18 are sealed by a sensor accommodation vessel leg portion 19 in which a pressure supply pipe 19a is formed and a sensor accommodation vessel lid portion 20, respectively. In the pressure detection apparatus disposed described above, since the circuit substrate constitutes a part of the sensor accommodation vessel 18, a small size, a reduced number of parts, an improvement on assembling properties can be achieved.

In the pressure detection apparatus according to the first aspect of the present invention, a pressure detection apparatus comprises a pressure sensor including a pressure detection element having a bridge circuit which is made by connecting gauge resistors formed around a diaphragm portion formed by decreasing a part of the element in thickness and an amplification circuit body serving as an amplification circuit of the bridge circuit except for an adjustment resistor, a package which airtightly accommodates the pressure sensor and has a pressure supply portion for supplying a pressure to be measured to the diaphragm portion, and a lead portion which electrically connects the pressure detection element to an external portion and is led from the package; an adjustment resistor part constituting the amplification circuit of the bridge circuit together with the amplification circuit body; a circuit substrate which mounts the pressure sensor and the adjustment resistor part by soldering so that the pressure sensor and the adjustment resistor part are exposed and which has a terminal portion for leading out an output from the amplification circuit; and a sensor accommodation vessel which accommodates an assembly constituted by the pressure sensor, the adjustment resistor part, and the circuit substrate. For this reason, the apparatus can be reduced in size, and output characteristics can be changed in a large range. In addition, the range of a pressure received by the apparatus can be changed without largely changing the apparatus in design.

In the pressure detection apparatus according to the second aspect of the present invention, the adjustment resistor part is mounted on a surface of the circuit substrate opposing the pressure sensor. For this reason, the apparatus can be more reduced in size.

In the pressure detection apparatus according to the third aspect of the present invention, the circuit substrate is integrated with the sensor accommodation vessel. For this reason, parts of the apparatus can be reduced in number, and the apparatus can be manufactured at low cost In the pressure detection apparatus according to the fourth embodiment of the present invention, the adjustment resistor part is a chip resistor part. For this reason, the apparatus can be more reduced in size.

What is claimed is:

1. A pressure detection apparatus comprising:

a pressure sensor including a pressure detection element having a bridge circuit which is made by connecting gauge resistors formed around a diaphragm portion formed by decreasing a part of said element in thickness and an amplification circuit body serving as an amplification circuit of said bridge circuit except for an adjustment resistor, a package which airtightly accommodates said pressure sensor and has a pressure supply portion for supplying a pressure to be measured to said diaphragm portion, and a lead portion which electrically connects said pressure detection element to an external portion and is led from said package;

an adjustment resistor part constituting said amplification circuit of said bridge circuit together with said amplification circuit body;

a circuit substrate which mounts said pressure sensor and said adjustment resistor part by soldering so that said pressure sensor and said adjustment resistor part are exposed and which has a terminal portion for leading out an output from said amplification circuit; and a sensor accommodation vessel which accommodates an assembly constituted by said pressure sensor, said adjustment resistor part, and said circuit substrate.

2. A pressure detection apparatus according to claim 1, wherein said adjustment resistor part is mounted on a surface of said circuit substrate opposing said pressure sensor.

3. A pressure detection apparatus according to claim 1, wherein said circuit substrate is integrated with said sensor accommodation vessel.

4. A pressure detection apparatus according to claims 1, wherein said adjustment resistor part is a chip resistor part.

* * * * *